(12) United States Patent
Brownscheidle et al.

(10) Patent No.: US 9,983,879 B2
(45) Date of Patent: May 29, 2018

(54) OPERATION OF A MULTI-SLICE PROCESSOR IMPLEMENTING DYNAMIC SWITCHING OF INSTRUCTION ISSUANCE ORDER

(71) Applicant: International Business Machines Corporation, Armonk, NY (US)

(72) Inventors: Jeffrey C. Brownscheidle, Seattle, WA (US); Sundeep Chadha, Austin, TX (US); Maureen A. Delaney, Richmond, VT (US); Dhivya Jeganathan, Austin, TX (US); Dung Q. Nguyen, Austin, TX (US); Salim A. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/059,853

(22) Filed: Mar. 3, 2016

(65) Prior Publication Data

US 2017/0255463 A1    Sep. 7, 2017

(51) Int. Cl.
*G06F 9/38* (2018.01)
*G06F 9/48* (2006.01)
*G06F 9/30* (2018.01)

(52) U.S. Cl.
CPC ........ *G06F 9/3836* (2013.01); *G06F 9/30189* (2013.01); *G06F 9/3861* (2013.01); *G06F 9/3891* (2013.01); *G06F 9/3838* (2013.01); *G06F 9/3851* (2013.01); *G06F 9/3855* (2013.01); *G06F 9/3865* (2013.01); *G06F 9/3867* (2013.01); *G06F 9/3885* (2013.01)

(58) Field of Classification Search
CPC .. G06F 9/3005; G06F 9/3836; G06F 9/30042; G06F 9/30189; G06F 9/3814; G06F 9/3838; G06F 9/3851; G06F 9/3855; G06F 9/3867; G06F 9/4806; G06F 9/4843; G06F 9/4881; G06F 9/5038; G06F 9/3861; G06F 9/3865; G06F 9/3891; G06F 9/3885
USPC ........................................ 712/214–219, 229
See application file for complete search history.

(56) References Cited

U.S. PATENT DOCUMENTS

| | | | |
|---|---|---|---|
| 5,898,853 A | 4/1999 | Panwar et al. | |
| 6,785,802 B1 | 8/2004 | Roy | |
| 7,711,929 B2 | 5/2010 | Burky et al. | |
| 8,285,974 B2 | 10/2012 | Singh et al. | |
| 8,380,964 B2 | 2/2013 | Bishop et al. | |
| 2007/0074005 A1* | 3/2007 | Abernathy | G06F 9/3814 712/214 |

(Continued)

*Primary Examiner* — Daniel H Pan
(74) *Attorney, Agent, or Firm* — Brandon C. Kennedy; Robert R. Williams; Kennedy Lenart Spraggins LLP (57) ABSTRACT

Operation of a multi-slice processor that includes execution slices implementing dynamic switching of instruction issuance order. Such a multi-slice processor includes determining a current issuance order for a plurality of instructions and a change in an operating condition of the multi-slice processor; responsive to determining the change in the operating condition, determining an alternate issuance order for the plurality of instructions; and responsive to determining the alternate issuance order, switching from the current issuance order for the plurality of instructions to the alternate issuance order for the plurality of instructions.

18 Claims, 6 Drawing Sheets

(56) References Cited

U.S. PATENT DOCUMENTS

2007/0186081 A1* 8/2007 Chaudhry ........... G06F 9/30181
 712/214
2010/0332804 A1* 12/2010 Golla .................... G06F 9/3838
 712/214
2014/0281402 A1* 9/2014 Comparan .......... G06F 9/30189
 712/214

* cited by examiner

OPERATION OF A MULTI-SLICE PROCESSOR IMPLEMENTING DYNAMIC SWITCHING OF INSTRUCTION ISSUANCE ORDER

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices implementing dynamic switching of instruction issuance order. Operation of such a multi-slice processor includes determining a current issuance order for a plurality of instructions and a change in an operating condition of the multi-slice processor; responsive to determining the change in the operating condition, determining an alternate issuance order for the plurality of instructions; and responsive to determining the alternate issuance order, switching from the current issuance order for the plurality of instructions to the alternate issuance order for the plurality of instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
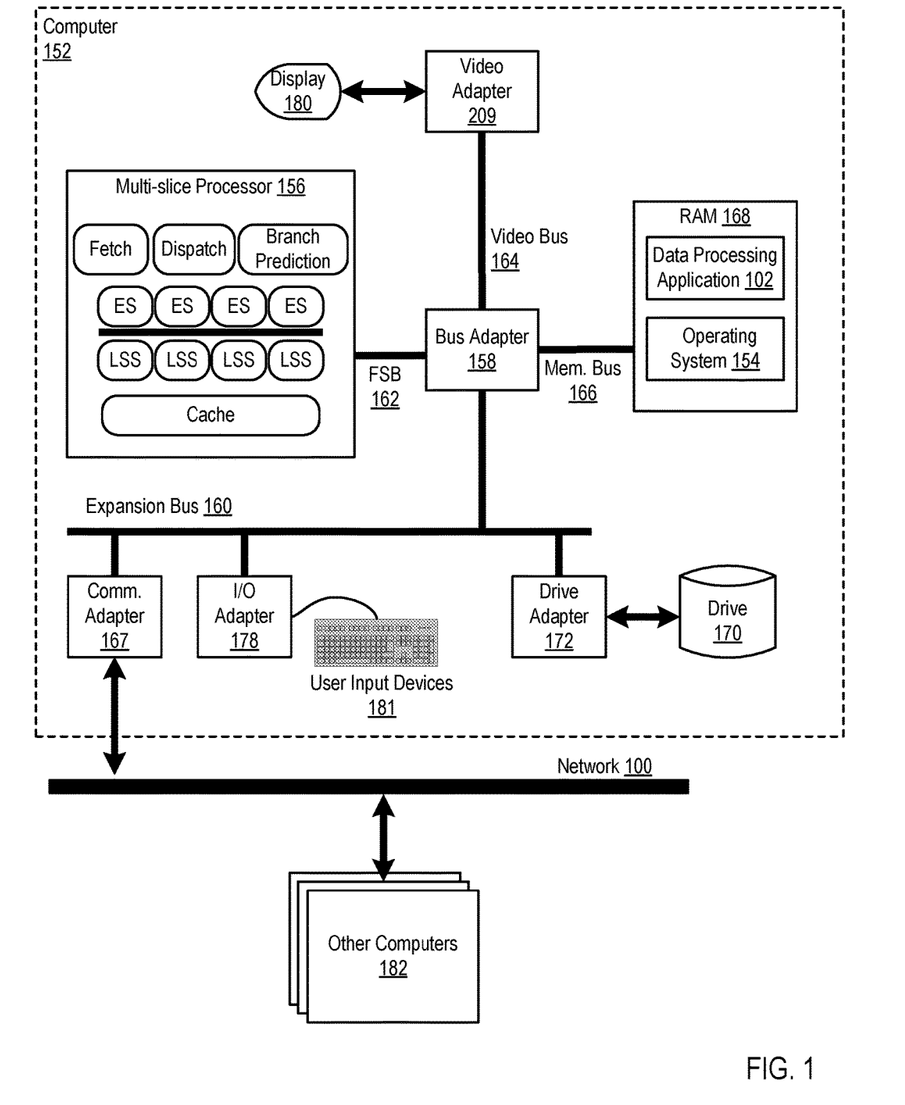
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
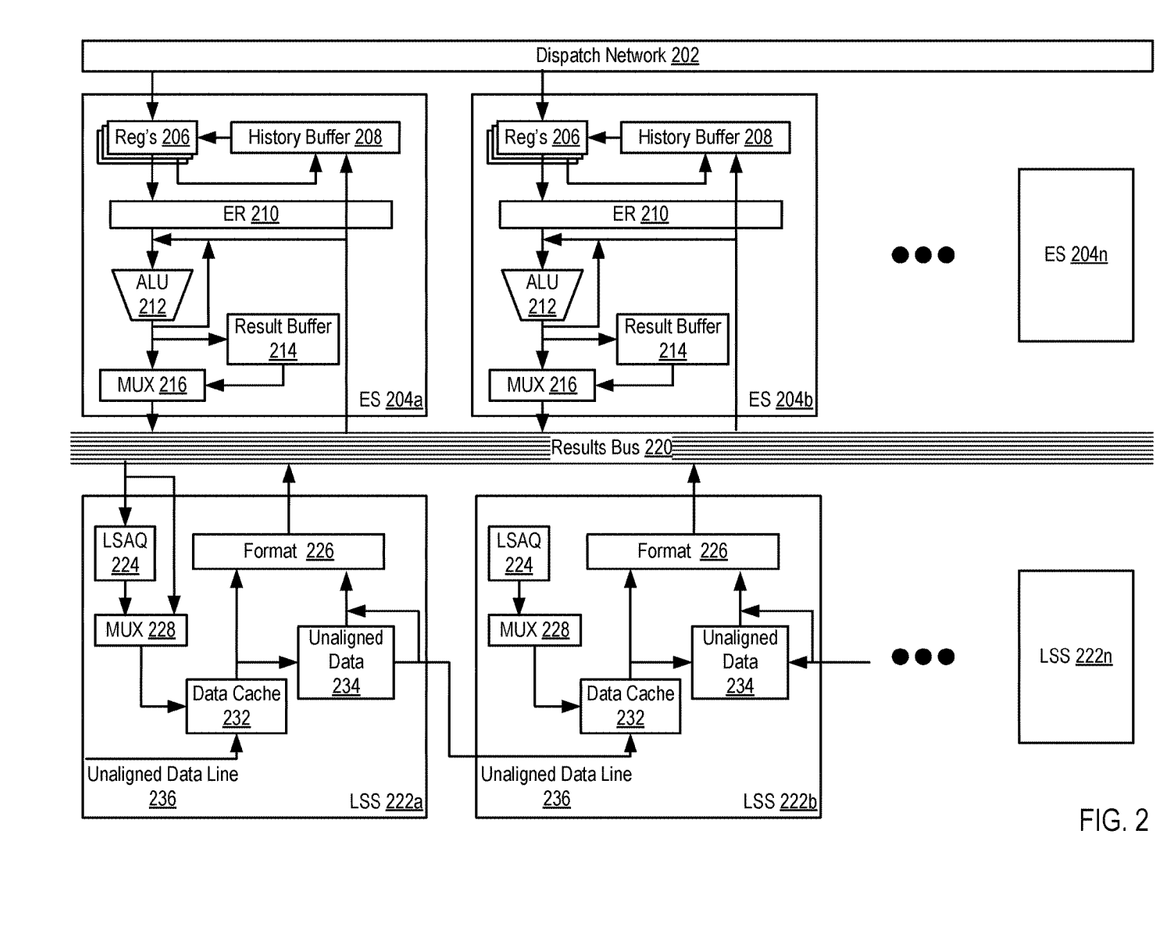
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load/store slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

Figure 3:
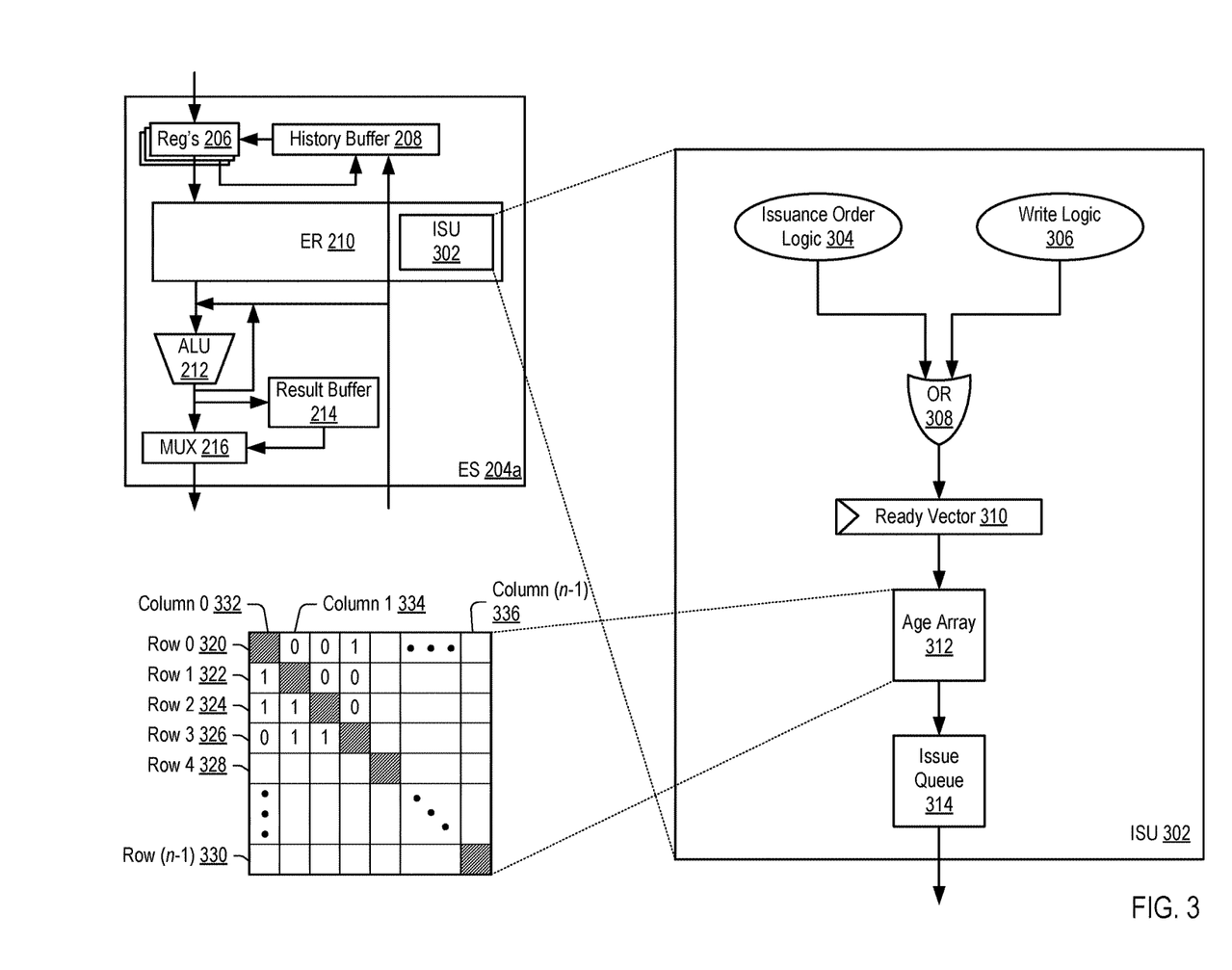
FIG. 3 sets forth a block diagram of a portion of the execution reservation station of an execution slice of a multi-slice processor implementing dynamic switching of instruction issuance order according to embodiments of the present invention.

For further explanation, FIG. 3 sets forth a block diagram of a portion of the execution reservation station (210) of an execution slice (204a) of a multi-slice processor (156) configured to implement dynamic switching of instruction issuance order. The execution slice (204a) includes an instruction sequencing unit (302).

Instruction sequencing unit (302) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" issuance, and the multi-slice processor may be considered an out-of-order machine. Out-of-order execution is in contrast to "in-order" issuance which may be an issuance of instructions in a program order, or an order in which the instructions are fetched by an instruction fetch unit (not shown).

Under normal conditions, issuance and execution of instructions in an out-of-order methodology may allow for more efficient overall execution of software due in part to elimination of delays from waiting for dependencies that may be present in an in-order processing of instructions. However, under certain conditions, if the multi-slice processor dynamically switches from an out-of-order processing methodology to an in-order processing methodology—or from an in-order processing methodology to an out-of-order processing methodology—then delays due to a current issuance order given a current condition may be avoided by switching an issuance order. The switch of issuance order may be for the duration of the operating condition, which may include a normal operating condition.

In other words, if a current operating condition changes such that in-order issuance of instructions is more computationally efficient, and if the current issuance order is out-of-order issuance, then it may be more efficient to temporarily change from out-of-order issuance to in-order issuance for the duration of the current operation condition.

Similarly, if a current operating condition changes such that out-of-order issuance of instructions is more computationally efficient, and if the current issuance order is in-order issuance, then it may be more efficient to change from in-order issuance to out-of-order issuance.

A dynamic switch from a current issuance order to an alternate issuance order may be determined and initiated by issuance order logic (304). In other words, in dependence upon a determination by the issuance order logic (304), the issuance of instructions from the instruction sequencing unit (302) may be either in-order issuance or out-of-order issuance.

For example, issuance order logic (304) may, responsive to determining normal operating conditions of the multi-slice processor, generate a logic low signal to OR gate (308), which results in the output from write logic (306) determining values for the ready vector (310)—where the write logic (306) is configured to determine out-of-order issuance of instructions. In this example, the ready vector (310), in combination with the age array (312), determine a next instruction to be issued from the issue queue (314). Because the next instruction may or may not be the oldest instruction, this issuance methodology is out-of-order issuance.

Otherwise, issuance order logic (304) may, responsive to determining a change in operating conditions, generate a logic high signal to OR gate (308), causing the ready vector (310) to indicate that all instructions are ready, whether the instructions are ready or not. Consequently, instead of the ready vector (310), in combination with the age array (312), generating a next ready instruction, the oldest instruction is determined to be issued from the issue queue (314). Because the next instruction is strictly the oldest instruction, this issuance methodology is in-order issuance.

Issue queue (314) may specify multiple instructions from the dispatch network (202) to be issued, where each of the instructions specified by the issue queue (314) correspond, respectively, to a ready value in the ready vector. Depending on the ready value for an entry of the ready vector, a corresponding instruction in the issue queue may be determined to be ready for execution or not. For example, if an issue queue specifies 12 instructions, then a ready value in a ready vector at position 5 would indicate whether an instruction at position 5 of the issue queue is ready for execution. Further, the ready vector may be referenced before the age array so that only ready instructions may be considered.

At a given time, multiple different instructions in the issue queue may be ready for execution, and to select which of these ready instructions is to be executed next, the age array is used to select an oldest instruction among the ready instructions to execute. As discussed above, given that the ready vector serves as a filter of instructions in the age array to be considered, determination of a next ready instruction is dependent upon how the ready vector is defined according to the inputs from the issuance order logic (304) and the write logic (304). As depicted in FIG. 3, the age array (312) represents an array of rows and columns corresponding to instructions in the issue queue.

For an issue queue of length n, the age array (312) may include a quantity of logical units (not shown) such that for each row representing an entry in the issue queue, there are (n−1) logical units representing (n−1) different columns, where each column corresponds to an entry in the issue queue. In this example, if {row i, column j} has a value of 0, then issue queue entry i is older than issue queue entry j, otherwise, issue queue entry i is younger than issue queue entry j. In this way, each logical unit stores a value representative of a row i and column j, where the value indicates a relative age of instructions at positions i and j within the issue queue.

Continuing with this example, a logical unit corresponding to age array position {row 0 (320), column 1 (334)} stores logical value zero—indicating that the instruction at issue queue position zero is older than the instruction at issue queue position 1. Similarly, a logical unit corresponding to age array position {row 2 (324), column 0 (332)} stores logical value one—indicating that the instruction at issue queue position two is younger than the instruction at issue queue position 0. Similarly, row 1 (322), row 3 (326), row 4 (328) . . . row (n−1) (330), and column 0 (332), column 1 (334) . . . column (n−1) (336) provide information serving as a basis for determining relative ages of all instructions in the issue queue. In this way, the age array (302) maintains information for determining a relative age of each instruction in the issue queue relative to every other instruction in the issue queue.

Write logic (306) may provide values to be written into the ready vector (310), as determined by an analysis of dependencies of a current instruction, or by an analysis of potential conflicts incurred by executing a given instruction, or by other conditions that may arise from issuing a given instruction. If the issuance order logic (304) has not determined to change the issuance order from out-of-order to in-order, then the output from write logic (306) into OR gate (308) serves as the definition of the ready vector (310), which is used to select a next ready instruction for issuance.

However, if the issuance order logic (304) determines that an operating condition has changed such that an alternate issuance order would likely be more efficient, then the issuance order logic (304) would transition from logical low to logical high, which overrides the input from write logic (306), and defining the ready vector (310) such that oldest instructions are selected for issuance—thereby switching the multi-slice processor from an out-of-order machine to an in-order machine.

Issuance order logic (304) may subsequently determine another operating condition change, and in response, switch from issuing instruction in-order to issuing instructions out-of-order. In this way, depending on a detected change in operating conditions, the multi-slice processor may dynamically switch between issuance methodologies to overcome system delays, system hangs, or other execution inefficiencies present in a current issuance methodology.

For example, in the case of a system hang, by switching from an out-of-order issuance of instructions to an in-order issuance of instructions, an instruction that is presently causing a hang state may not be selected by using a different issuance order, thereby overcoming a system hang and some of the delay caused by the system hang.

Figure 4:
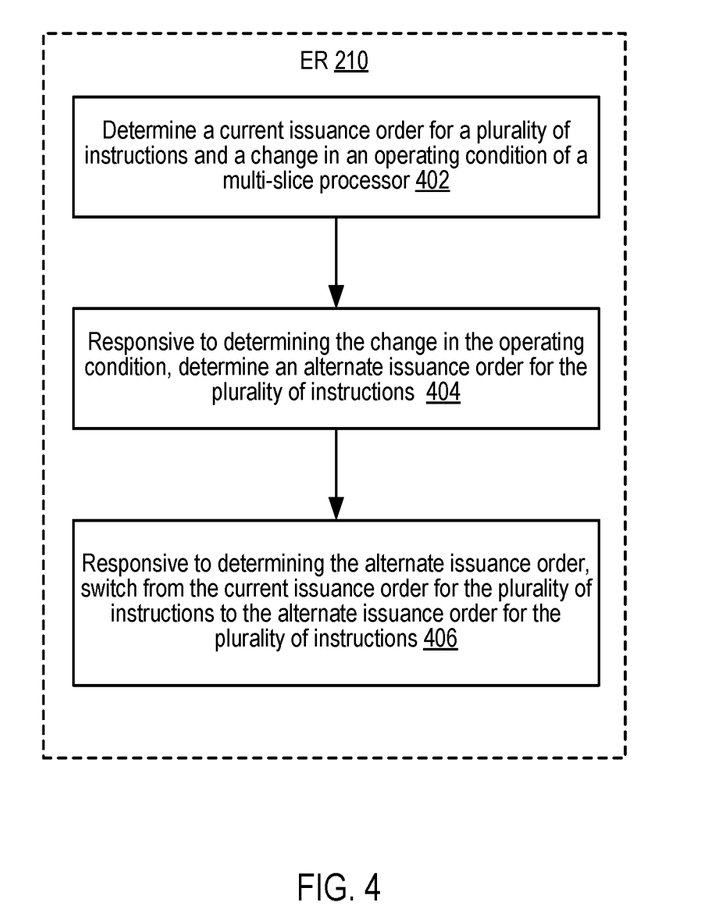
FIG. 4 forth a flow chart illustrating an exemplary method of operation of a multi-slice processor implementing dynamic switching of instruction issuance order according to embodiments of the present invention.

For further explanation, FIG. 4 sets forth a flow chart illustrating an exemplary method of operation of an execution slice (204a) of a multi-slice processor (156) implementing dynamic switching of instruction issuance order. The method of FIG. 4 may be carried out by the multi-slice processor (156) similar to that in the examples of FIGS. 2 and 3.

The method of FIG. 4 includes determining (402) a current issuance order for a plurality of instructions and a change in an operating condition of a multi-slice processor. Determining (402) a current issuance order may be carried out by issuance logic (304) determining that no current operating condition exists such that it would be more efficient to issue instructions in-order instead of out-oforder—thereby determining a current issuance order as out-of-order. Otherwise, the current issuance order may be determined to be in-order.

If a current issuance order is out-of-order, determining (402) a change in an operating condition of the multi-slice processor may be carried out by the issuance order logic (304) determining that a system hang state exists, determining that a system recovery condition exists, or determining that some other operating condition exists such that it would be more efficient to switch to in-order issuance of instructions. A system recovery may be a period during which a flush of previously issued instructions is being performed.

If a current issuance order is in-order, determining (402) a change in an operating condition of the multi-slice processor may be carried out by the issuance order logic (304) determining that a system hang state no longer exists, determining that a system recovery has completed, or determining that some other operating condition exists such that it would be more efficient to switch to out-of-order issuance of instructions.

The method of FIG. 4 also includes, responsive to determining the change in the operating condition, determining (404) an alternate issuance order for the plurality of instructions. If a current issuance order is out-of-order, determining (404) an alternate issuance order may be carried out by the issuance order logic (304): determining that a system hang state has been detected, determining that a system recovery condition exists, or determining that some other operating condition exists such that it would be more efficient to switch to in-order issuance of instructions.

If a current issuance order is in-order, determining (404) an alternate issuance order may be carried out by the issuance order logic (304): determining that a system hang state no longer exists, determining that a system recovery has completed, or determining that some other operating condition exists such that it would be more efficient to switch to out-of-order issuance of instructions.

The method of FIG. 4 also includes, responsive to determining the alternate issuance order, switching (406) from the current issuance order for the plurality of instructions to the alternate issuance order for the plurality of instructions. If the current issuance order is out-of-order, switching (406) from the current issuance order to the alternate issuance order may be carried out by the issuance order logic (304) generating logic high values for the OR gate (308) to set all bits of the ready vector (310) to ready—consequently, the instruction determined by the age array (312) is the next oldest instruction, which has the effect of the issue queue (314) issuing in-order instructions.

If the current issuance order is in-order, switching (406) from the current issuance order to the alternate issuance order may be carried out by the issuance order logic (304) generating logic low values for the OR gate (308) to allow write logic (306) to set the bits of the ready vector (310) according to readiness, rather than setting all bits logic high—consequently, the instruction determined by the age array (312) is the next ready instruction, which has the effect of the issue queue (314) issuing out-of-order instructions.

In this way, a multi-slice processor may implement dynamic switching of issuance order methodologies to overcome system delays or inefficiencies that would otherwise be incurred by maintaining a current issuance methodology.

Figure 5:
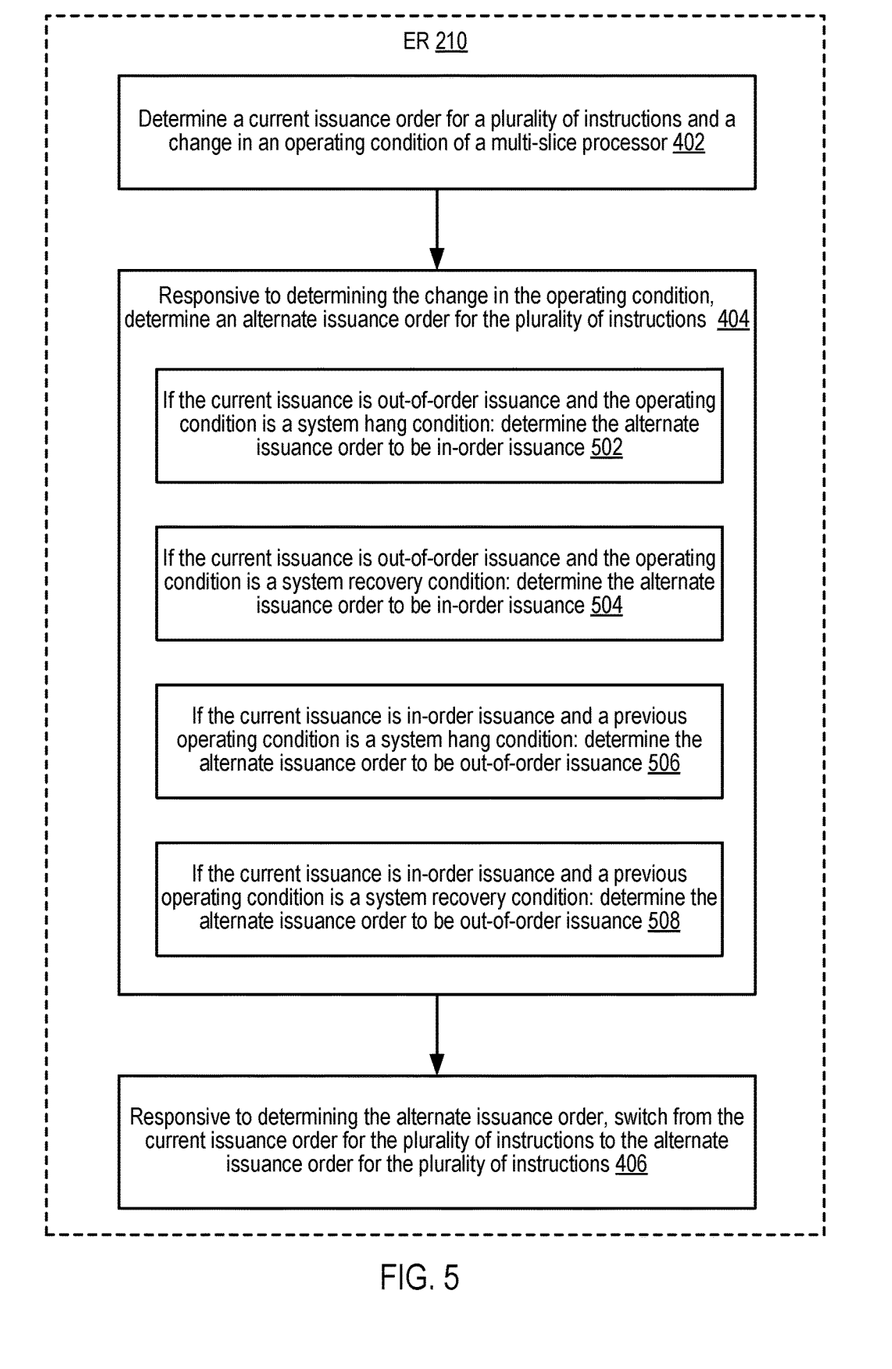
FIG. 5 forth a flow chart illustrating an exemplary method of operation of a multi-slice processor implementing dynamic switching of instruction issuance order according to embodiments of the present invention.

For further explanation, FIG. 5 sets forth a flow chart illustrating another exemplary method of operation of an execution slice (204a) of a multi-slice processor (156) implementing dynamic switching of instruction issuance order. The method of FIG. 5 may be carried out by the multi-slice processor (156) similar to that in the examples of FIGS. 2-4.

The method of FIG. 5 is similar to the method of FIG. 4 in that the method of FIG. 5 also includes determining (402) a current issuance order for a plurality of instructions and a change in an operating condition of a multi-slice processor; responsive to determining the change in the operating condition, determining (404) an alternate issuance order for the plurality of instructions; and responsive to determining the alternate issuance order, switching (406) from the current issuance order for the plurality of instructions to the alternate issuance order for the plurality of instructions.

The method of FIG. 5 differs, however, from the method of FIG. 4 in that the method of FIG. 5 specifies that determining (404) an alternate issuance order may include: if the current issuance is out-of-order issuance and the operating condition is a system hang condition: determining (502) the alternate issuance order to be in-order issuance; if the current issuance is out-of-order issuance and the operating condition is a system recovery condition: determining (504) the alternate issuance order to be in-order issuance; if the current issuance is in-order issuance and a previous operating condition is a system hang condition: determining (506) the alternate issuance order to be out-of-order issuance; and if the current issuance is in-order issuance and a previous operating condition is a system recovery condition: determining (508) the alternate issuance order to be out-of-order issuance.

Determining (502) the alternate issuance order may be carried out by the issuance order logic (304) determining that a current issuance order is out-of-order and the current operating condition is a system hang condition, and in response, determining the alternate issuance order to be in-order issuance. Further, determining that a current issuance order is out-of-order may be based at least in part on a previous operating condition being a normal operating condition.

Determining (504) the alternate issuance order may be carried out by the issuance order logic (304) determining that a current issuance order is out-of-order and the current operating condition is a system recovery condition, and in response, determining the alternate issuance order to be in-order issuance. Further, determining that a current issuance order is out-of-order may be based at least in part on a previous operating condition being a normal operating condition.

Determining (506) the alternate issuance order may be carried out by the issuance order logic (304) determining that a current issuance order is in-order and a previous operating condition is a system hang condition, and in response, determining the alternate issuance order to be out-of-order issuance. Further, determining that a current issuance order is in-order may be based at least in part on a current condition being a normal operating condition.

Determining (508) the alternate issuance order may be carried out by the issuance order logic (304) determining that a current issuance order is in-order and a previous operating condition is a system recovery condition, and in response, determining the alternate issuance order to be out-of-order issuance. Further, determining that a current issuance order is in-order may be based at least in part on a current condition being a normal operating condition.

Generally, the issuance order logic (304) may determine an issuance order to switch to based at least in part on which issuance order is most conducive to an alternate issuance methodology—where a determination on whether an issuance order is most conducive may be based on how efficiently a given plurality of instructions executes within the issuance methodology.

Figure 6:
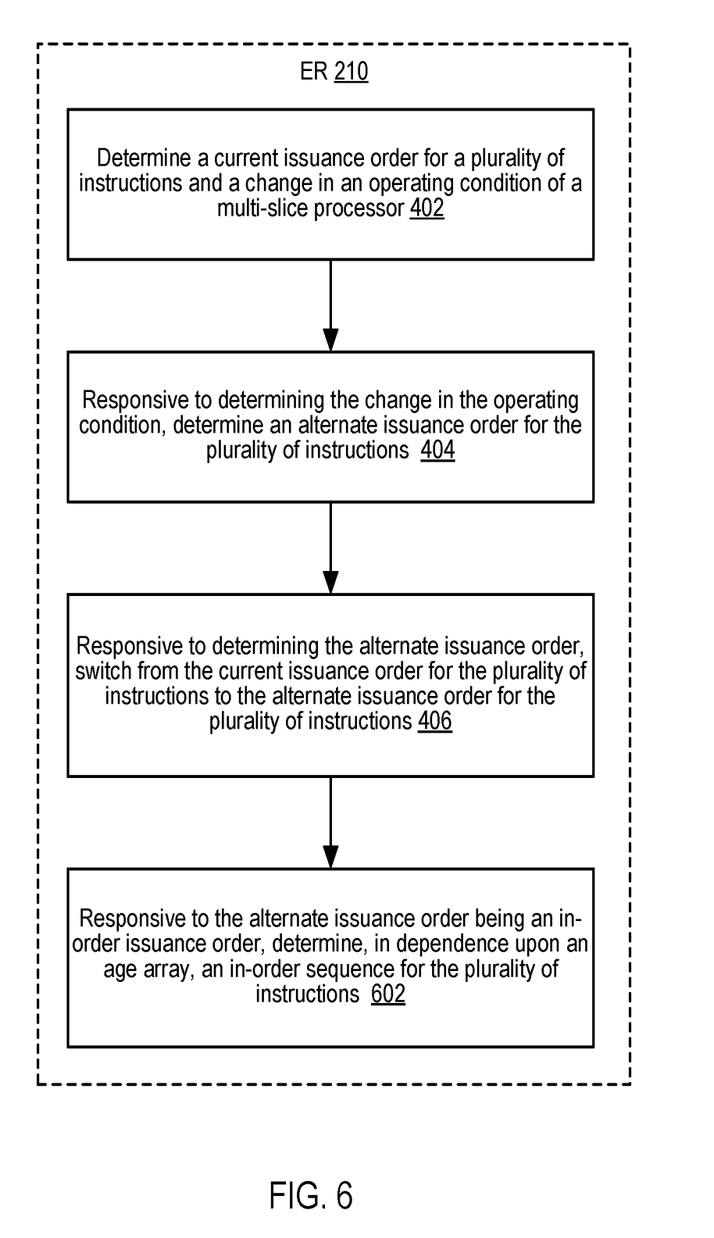
FIG. 6 sets forth a flow chart illustrating an exemplary method of operation of a multi-slice processor implementing dynamic switching of instruction issuance order according to embodiments of the present invention.

For further explanation, FIG. 6 sets forth a flow chart illustrating another exemplary method of operation of an execution slice (204a) of a multi-slice processor (156) implementing dynamic switching of instruction issuance order. The method of FIG. 6 may be carried out by the multi-slice processor (156) similar to that in the examples of FIGS. 2-5.

The method of FIG. 6 is similar to the method of FIG. 4 in that the method of FIG. 6 also includes determining (402) a current issuance order for a plurality of instructions and a change in an operating condition of a multi-slice processor; responsive to determining the change in the operating condition, determining (404) an alternate issuance order for the plurality of instructions; and responsive to determining the alternate issuance order, switching (406) from the current issuance order for the plurality of instructions to the alternate issuance order for the plurality of instructions.

The method of FIG. 6 differs, however, from the method of FIG. 4 in that the method of FIG. 6 includes, responsive to the alternate issuance order being an in-order issuance order, determining, in dependence upon an age array, an in-order sequence for the plurality of instructions. Determining (602) an in-order sequence may be carried out by the issuance order logic (304) generating a logic high value to set all bits in the ready vector (310) to indicate readiness, thereby producing an output from the age array (312) to indicate an oldest instruction, which corresponds to issuing instructions by oldest first, which then generates an in-order issuance of instructions in the issue queue (314).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, the method comprising:
   determining a current issuance order for a plurality of instructions and a change in an operating condition of the multi-slice processor;
   responsive to determining the change in the operating condition, determining an alternate issuance order for the plurality of instructions;
   responsive to determining the alternate issuance order, switching from the current issuance order for the plurality of instructions to the alternate issuance order for the plurality of instructions; and
   responsive to the alternate issuance order being an in-order issuance order, determining, in dependence upon an age array and a ready vector, an in-order sequence for the plurality of instructions, wherein determining the in-order sequence for the plurality of instruction comprises indicating, in the ready vector, that each instruction is ready regardless of a ready status of the instruction.

2. The method of claim 1, wherein the operating condition comprises one of: a normal operating condition, a system hang condition, and a system recovery condition.

3. The method of claim 2, wherein determining the alternate issuance order is dependent upon both the change in the operating condition and the current issuance order.

4. The method of claim 3, wherein determining the alternate issuance order comprises:
   if the current issuance is out-of-order issuance and the operating condition is a system hang condition: determining the alternate issuance order to be in-order issuance;
   if the current issuance is out-of-order issuance and the operating condition is a system recovery condition: determining the alternate issuance order to be in-order issuance;
   if the current issuance is in-order issuance and a previous operating condition is a system hang condition: determining the alternate issuance order to be out-of-order issuance; and
   if the current issuance is in-order issuance and a previous operating condition is a system recovery condition: determining the alternate issuance order to be out-of-order issuance.

5. The method of claim 1, wherein the multi-slice processor comprises an issue queue and an instruction sequencing unit, and wherein the instruction sequencing unit includes an age array indicating relative ages of each instruction in an issue queue relative to each other instruction in the issue queue.

6. The method of claim 5, wherein each row and column of the age array corresponds to an entry in the issue queue, and wherein each age array position indicates whether the instruction corresponding to the row of the age array position is younger than the instruction corresponding to the column of the age array position.

7. A multi-slice processor comprising:
   a plurality of execution slices, wherein the multi-slice processor is configured to carry out the operations of:
      determining a current issuance order for a plurality of instructions and a change in an operating condition of the multi-slice processor;
      responsive to determining the change in the operating condition, determining an alternate issuance order for the plurality of instructions;
      responsive to determining the alternate issuance order, switching from the current issuance order for the plurality of instructions to the alternate issuance order for the plurality of instructions; and
      responsive to the alternate issuance order being an in-order issuance order, determining, in dependence upon an age array and a ready vector, an in-order sequence for the plurality of instructions, wherein determining the in-order sequence for the plurality of instruction comprises indicating, in the ready vector, that each instruction is ready regardless of a ready status of the instruction.

8. The multi-slice processor of claim 7, wherein the operating condition comprises one of: a normal operating condition, a system hang condition, and a system recovery condition.

9. The multi-slice processor of claim 8, wherein determining the alternate issuance order is dependent upon both the change in the operating condition and the current issuance order.

10. The multi-slice processor of claim 9, wherein determining the alternate issuance order comprises:
    if the current issuance is out-of-order issuance and the operating condition is a system hang condition: determining the alternate issuance order to be in-order issuance;
    if the current issuance is out-of-order issuance and the operating condition is a system recovery condition: determining the alternate issuance order to be in-order issuance;
    if the current issuance is in-order issuance and a previous operating condition is a system hang condition: determining the alternate issuance order to be out-of-order issuance; and if the current issuance is in-order issuance and a previous operating condition is a system recovery condition: determining the alternate issuance order to be out-of-order issuance.

11. The multi-slice processor of claim 7, wherein the multi-slice processor comprises an issue queue and an instruction sequencing unit, and wherein the instruction sequencing unit includes an age array indicating relative ages of each instruction in an issue queue relative to each other instruction in the issue queue.

12. The multi-slice processor of claim 11, wherein each row and column of the age array corresponds to an entry in the issue queue, and wherein each age array position indicates whether the instruction corresponding to the row of the age array position is younger than the instruction corresponding to the column of the age array position.

13. An apparatus comprising:
a plurality of execution slices, wherein the multi-slice processor is configured to carry out the operations of:
determining a current issuance order for a plurality of instructions and a change in an operating condition of the multi-slice processor;
responsive to determining the change in the operating condition, determining an alternate issuance order for the plurality of instructions;
responsive to determining the alternate issuance order, switching from the current issuance order for the plurality of instructions to the alternate issuance order for the plurality of instructions; and
responsive to the alternate issuance order being an in-order issuance order, determining, in dependence upon an age array and a ready vector, an in-order sequence for the plurality of instructions, wherein determining the in-order sequence for the plurality of instruction comprises indicating, in the ready vector, that each instruction is ready regardless of a ready status of the instruction.

14. The apparatus of claim 13, wherein the operating condition comprises one of: a normal operating condition, a system hang condition, and a system recovery condition.

15. The apparatus of claim 14, wherein determining the alternate issuance order is dependent upon both the change in the operating condition and the current issuance order.

16. The apparatus of claim 15, wherein determining the alternate issuance order comprises:
if the current issuance is out-of-order issuance and the operating condition is a system hang condition: determining the alternate issuance order to be in-order issuance;
if the current issuance is out-of-order issuance and the operating condition is a system recovery condition: determining the alternate issuance order to be in-order issuance;
if the current issuance is in-order issuance and a previous operating condition is a system hang condition: determining the alternate issuance order to be out-of-order issuance; and
if the current issuance is in-order issuance and a previous operating condition is a system recovery condition: determining the alternate issuance order to be out-of-order issuance.

17. The apparatus of claim 13, wherein the multi-slice processor comprises an issue queue and an instruction sequencing unit, and wherein the instruction sequencing unit includes an age array indicating relative ages of each instruction in an issue queue relative to each other instruction in the issue queue.

18. The apparatus of claim 17, wherein each row and column of the age array corresponds to an entry in the issue queue, and wherein each age array position indicates whether the instruction corresponding to the row of the age array position is younger than the instruction corresponding to the column of the age array position.

* * * * *